July 3, 1923.

C. H. BENCKENSTEIN

TUBING SPIDER

Filed Oct. 24, 1921   2 Sheets-Sheet 1

1,460,402

July 3, 1923.

C. H. BENCKENSTEIN

TUBING SPIDER

Filed Oct. 24, 1921   2 Sheets-Sheet 2

1,460,402

Inventor
Charles H. Benckenstein.

By Eccleston & Eccleston

Attorneys

Patented July 3, 1923.

1,460,402

UNITED STATES PATENT OFFICE.

CHARLES H. BENCKENSTEIN, OF VINTON, LOUISIANA.

TUBING SPIDER.

Application filed October 24, 1921. Serial No. 510,011.

*To all whom it may concern:*

Be it known that I, CHARLES H. BENCKENSTEIN, a citizen of the United States, and residing at Vinton, in the parish of Calcasieu and State of Louisiana, have invented certain new and useful Improvements in Tubing Spiders, of which the following is a full, clear, and exact description.

My invention relates to tubing spiders, and one of the particular applications of the invention is in connection with the lowering of pipe, tubing, or casing, into a well, and the removal of the same from a well; though it will be obvious from the description hereinafter that the invention is equally well adapted to the raising and lowering of any similar structures.

Heretofore much time and labor has been required for the operation of lowering and raising pipe, tubing, casing, etc., in a well, and one of the objects of my invention is to greatly reduce the time and labor heretofore involved in this operation.

Another object of my invention is to provide an apparatus of this character which will permit tighter joints to be made between the pipe connections, than has been possible with previously known apparatus.

A further object of my invention resides in the provision of a tubing spider so constructed on the interior as to prevent any catching or hanging up of the pipe collars, while passing through the apparatus.

Still another object of my invention is to provide an apparatus of this character which is formed of two parts, whereby it may be quickly and easily mounted or dismounted.

Another advantage of my invention resides in the provision of a special operating mechanism for positively controlling the movements of the rocking arm and sliding jaw in proper sequence.

Other and further objects of my invention will appear as the description proceeds.

The common practice has formerly been to raise and lower pipe in a well by means of "elevators". One "elevator" would be attached around the pipe below the collar thereof, and the pipe would then be pulled out to the desired height by a derrick. After pulling one or more sections from the hole, a second "elevator" would be attached around the bottom collar of the pipe, and the pipe then let down onto this second "elevator". The pipe would then be disjointed and removed, and the operation would be repeated. In lowering pipe into the well, the operation was much the reverse to that of taking it out.

In some instances instead of using an "elevator" to hold the pipe left standing in the well, corrugated wedges were placed between the pipe and the casing.

My invention takes the place of the holding "elevator", or the holding wedges, and by the substitution of my invention, not only is much time and labor saved, but also the operation is performed in a much more satisfactory manner.

The present invention constitutes an improvement on a tubing spider invented by me and forming the subject matter of another application, Ser. No. 454,445, filed Mch. 22, 1921.

One of the important improvements incorporated in the present invention consists in making the apparatus in two parts so that it can be quickly mounted in place, and without the necessity of first removing the top section of tubing. While I have shown the two parts of the apparatus as hingedly connected, this is not necessary, but greatly adds to the convenience of operating the device.

Another important improvement residing in the present invention is in the particular means for operating the rocking arm and sliding jaw. It will appear clearly in the following description, that in using the operating mechanism disclosed herein the parts are always positively controlled and always move in proper sequence.

I will now proceed to describe one particular form of my invention, it being understood that those skilled in the art may make many changes and modifications therein, without departing from the spirit of my invention as defined in the appended claims; and the drawings forming a part of this application are therefore to be considered merely as illustrative and not in any limiting sense.

In the drawings:

Figure 4 is a plan view of the apparatus in closed position.

Figure 5 is a plan view of the apparatus showing the two sections thereof swung apart, and, Figure 6 is a fragmentary plan view of the sliding jaw and inclined face of the rocking member.

Figure 1:
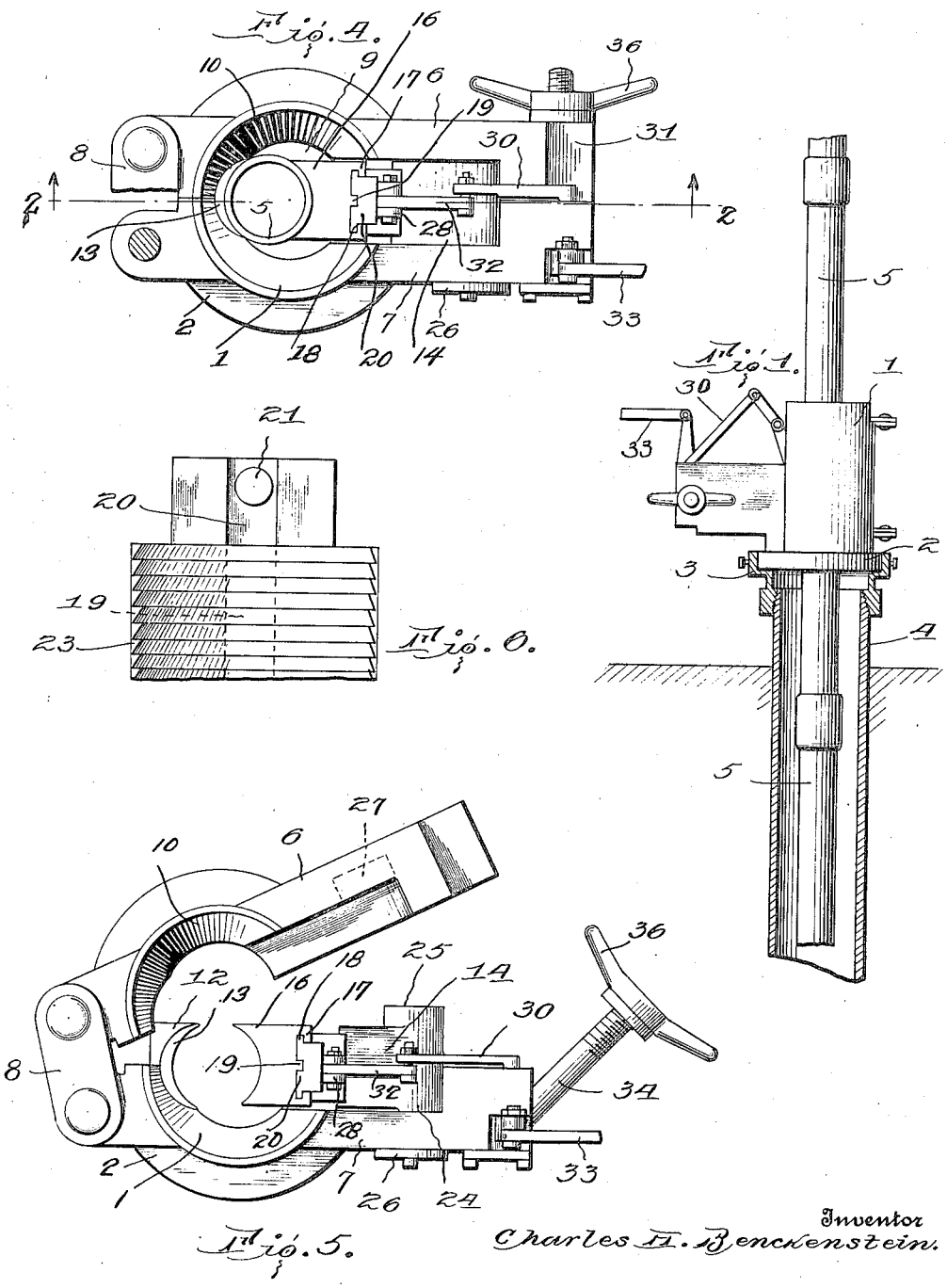
Figure 1 is an elevation of the tubing spider mounted on the casing head, the latter being shown in section.

Referring to the drawings more in detail, numeral 1 indicates generally the body of the apparatus, having the lower portion 2 thereof so constructed as to be securely attached to the head 3 of the casing 4. Numeral 5 indicates the tube or pipe extending from the well up through the spider. It will be understood, of course, that the apparatus may be made of any desired size to handle different sizes of pipe, and that the bottom portion of the spider will be so constructed as to fit either the drilling rig of a well that is being drilled, or the casing of a completed well.

The apparatus is formed of two sections indicated by numerals 6 and 7, and these sections are shown as hingedly connected by means of links 8.

A semi-cylindrical passage is formed in each of the sections, so that when the apparatus is closed there is a cylindrical passage 9, extending vertically therethrough. The passage is flared at the top and bottom as indicated by numerals 10 and 11.

A plate 12 having gripping teeth 13 thereon is mounted in the wall of section 7, the curvature of the gripping teeth being substantially the same as the curvature of the pipe to be handled. It will be obvious that instead of mounting the toothed plate in one of the sections, I may prefer to form the teeth in the walls of both sections 6 and 7, so that when the sections are closed a gripping surface similar to the one just described, will be presented.

Oppositely arranged with respect to the above described gripping teeth, is a rocking arm 14, pivotally mounted in the body of the spider, as will be described hereinafter. The rocking arm 14 has an inclined face 15 on which is slidably mounted a gripping jaw 16. The particular manner in which the jaw is slidably mounted on the inclined face constitutes no part of the present invention; but in the particular construction illustrated the rear of the jaw is provided with portions 17 overlapping flanges 18 on the rocking arm; and also with a center tongue 19, engaging a groove 20 in the inclined face of the rocking member. A pin 21 (Fig. 6) is employed to engage the center tongue and thus limit the upward or outward movement of the sliding jaw; the downward or inward movement of the same being limited by the engagement of the jaw with the flange 22 of the rocking member.

The face of the sliding jaw is concave, and is provided with gripping teeth or ridges 23, the curvature thereof being substantially the same as the curvature of the pipe or tubing to be handled. As shown in the drawings, the teeth in the body of the apparatus and also those on the face of the jaw, are arranged to act upwardly.

The rocking member 14 is provided with journal bearings 24 and 25, the journal 24 being secured to section 7 by means of collar 26, so that the rocking member will remain in position when the sections 6 and 7 are separated. The section 6 is recessed for the purpose of receiving the journal bearing 25 when the sections are closed, the recess being indicated by numeral 27.

The means for operating the sliding jaw and rocking arm will now be described.

A stirrup 28 is slidably positioned in the rocking member just behind the sliding jaw, the stirrup being provided with an inwardly projecting portion 29 for engaging the sliding jaw. A bell-crank lever 30 is shown as having a bearing in section 7, and the other section is cut away as indicated by numeral 31, so that the operating mechanism does not prevent the closing of the sections. A link 32 connects the stirrup with one arm of the bell-crank lever, and the link 33 attached to the other arm of the bell-crank lever may lead to any desired foot operating mechanism.

Figure 2:
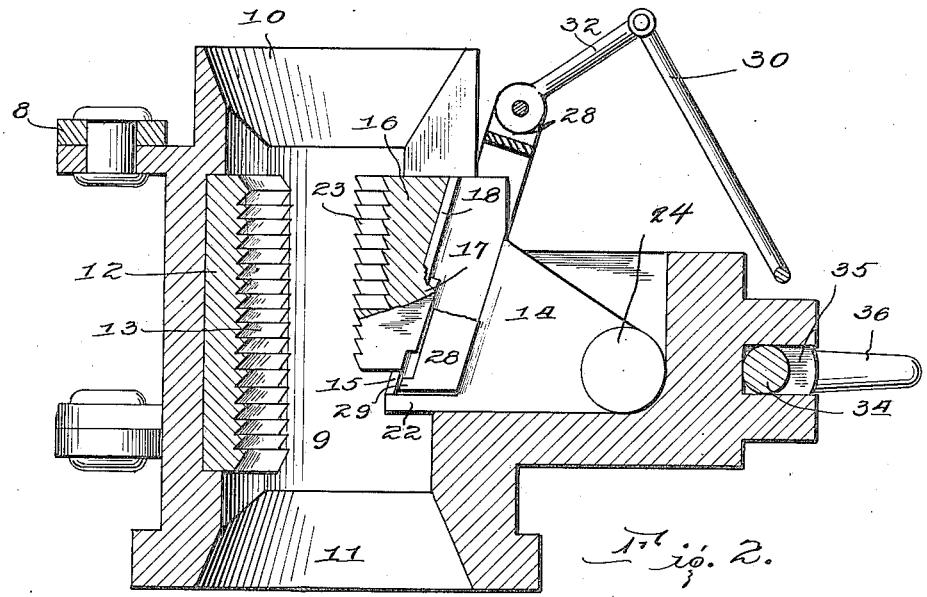
Figure 2 is a vertical sectional view of the spider in gripping position, taken on line 2—2 of Figure 4 the sliding jaw and stirrup being broken away to more clearly show the connection.

The operation of this mechanism will be obvious. As the stirrup is raised it lifts the sliding jaw until the jaw has traveled the full extent of its upward movement, after which the continued movement of the bell-crank lever causes the rocking arm to be thrown backward, or to the right as shown in Fig. 2. In throwing the rocking arm and sliding jaw into operative position, the action is just the reverse, the rocking arm being first thrown to the left, and thereafter a continued movement of the bell-crank lever permits the sliding jaw to slide downwardly into engagement with the pipe. The parts are thus caused to move in their proper sequence, and this is of great importance because by such an arrangement the sliding jaw is positively maintained in its elevated position until after the rocking arm is in its operative position.

If desired, springs could be employed for normally holding the sliding jaw in its elevated position. Such springs are illustrated in the original application previously referred to, Ser. No. 454,445.

For the purpose of securely locking the two sections in closed position, I provide a swinging bolt 34 pivotally attached to one of the sections and engaging in a groove 35 in the other section. A nut 36 screw-threaded on the bolt 34 engages the wall of section 6 and draws the two sections firmly together.

Figure 3:
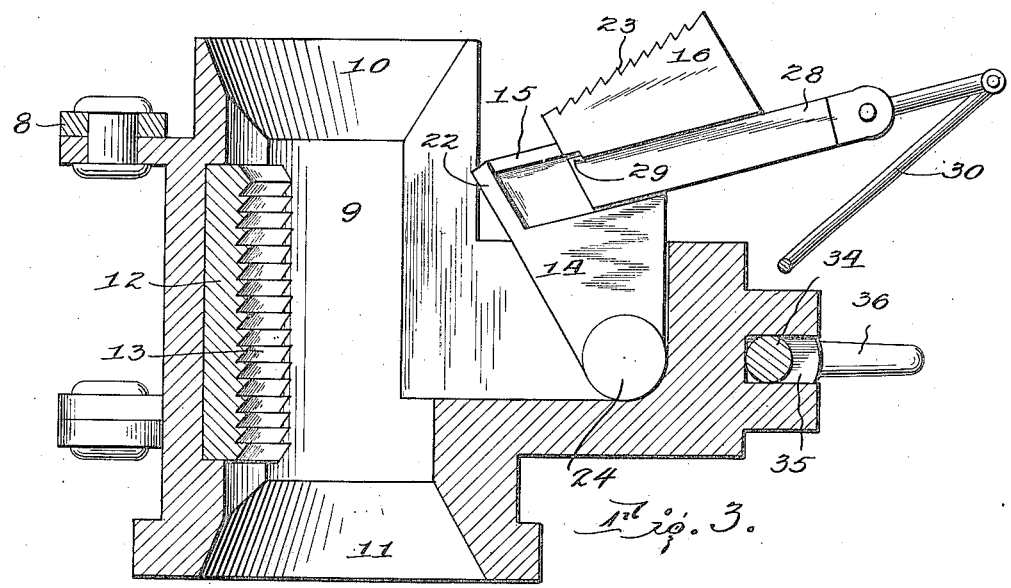
Figure 3 is a vertical sectional view similar to Figure 2, but showing the apparatus in open position.

In using my invention, the operation of removing pipe from a well is as follows:

Assuming the spider to be mounted in position and the rocking arm and sliding jaw thrown to the right (Fig. 3), then the pipe is freely withdrawn through the cylindrical passage until one or more sections of the pipe are clear; any desired means, such as a derrick and "elevator" being employed to hoist the pipe. After the pipe has been elevated to the height desired, the rocking arm is thrown down to the position shown in Fig. 2. When this is done, the concave toothed surface of the sliding jaw engages and forces the pipe over into engagement with the toothed surface 13 provided in the wall of the passage. The downward pulling force exerted by the pipe causes the jaw 16 to slide down the inclined face of the rocking arm, with a resulting wedging action, which causes both sets of teeth to bite into the pipe and hold it securely, without any liability of its dropping.

The pipe sections are now disjointed and moved to one side.

The "elevator" or any other hoisting means is now connected to the top section remaining; the rocking arm and sliding jaw are thrown back thereby releasing the pipe; which is now hoisted to the desired extent, and the operation previously described is repeated.

The operation of lowering pipe or tubing is practically the reverse of the operation of removing the same, and a description thereof is thought to be unnecessary.

In the foregoing brief description of the operation I have assumed the apparatus to be mounted in place. One of the important features of the present invention relates to the manner of mounting the apparatus. In the original application Ser. No. 454,445, the body of the spider containing the cylindrical passage was shown as formed of one piece. In using the apparatus so constructed it is necessary in pulling tubing from a well, to first remove the top or first joint of tubing. This is necessary because the elevators around the top joint and the tubing ring, are too large to pass through the cylindrical passage. The same is true in lowering tubing into a well, the difficulty being in handling the last joint rather than the first. Of course the above remarks also apply in putting or pulling the drill stem in or out of the well. By forming the body of the apparatus in two parts it is only necessary to raise the first joint and tubing ring a few feet; the two sections of the spider being then set around the tubing and then secured together. It is thus obvious that by forming the apparatus in two parts it may be easily and quickly applied and without the necessity of first removing the top joint. It is, of course, not my intention to be limited to any particular manner of dividing the body into parts, or to any particular manner of securing the parts together, but I find that the convenience of the apparatus is greatly increased by hingedly connecting them in the manner illustrated.

It is to be noted that by having the passage 9 flared at both top and bottom it is impossible for the couplings to be caught, and when the gripping mechanism is thrown back the passage is entirely clear, so that the pipe and couplings may pass therethrough clearly, and without any liability of the pipe being hung up, either in lowering or raising it.

Having fully described my invention, what I claim as new and desire to secure by Letters Patent is:

1. An apparatus of the character described composed of two sections, means for securing the two sections together, the two sections being so arranged as to form a substantially cylindrical passage therethrough when the two sections are together, a rocking arm carried by one of the sections, and a gripping jaw slidably mounted on said rocking arm.

2. A spider composed of two sections hingedly connected, the two sections being so arranged as to form a substantially cylindrical passage therethrough when the two sections are together, and a rocking arm carried by one of the sections, and adapted to be projected into said passage.

3. A tubing spider composed of two sections hingedly connected, the two sections being so arranged as to form a substantially cylindrical passage therethrough when the two sections are together, a rocking arm carried by one of the sections and adapted to be projected into the passage, and a gripping jaw slidably mounted on said rocking arm.

4. An apparatus of the character described composed of two sections, means for securing the two sections together, the two sections being so arranged as to form a substantially cylindrical passage therethrough when the two sections are together, a rocking arm having one bearing journaled in one of the sections, and the other bearing adapted to be received in the other section, and a gripping jaw slidably mounted on the rocking arm.

5. A spider having a passage therethrough, a rocking arm adapted to be projected into said passage, a gripping jaw slidably mounted on said arm, means for limiting the upward movement of the sliding gripping jaw, and means operatively associated with said sliding jaw for first lifting the same and then rotating the rocking member.

6. A tubing spider having a passage therethrough, a rocking arm adapted to be projected into the passage, a gripping jaw slidably mounted on the rocking arm, and operating means associated with the sliding jaw to cause said jaw and rocking arm to move in proper sequence.

7. An apparatus of the character described composed of a plurality of sections and having a passage therethrough, a rocking arm adapted to be projected into said passage, a gripping jaw slidably mounted on said arm, means for limiting the movement of the sliding gripping jaw, a stirrup arranged to engage and lift the sliding jaw, a bell-crank lever mounted in one of the sections, and a link connecting one arm of the bell-crank lever with the stirrup.

8. A spider composed of two sections, means for securing the sections together whereby a substantially cylindrical passage is formed, a rocking arm adapted to be projected into the passage, a gripping jaw slidably mounted on the rocking arm, and operating means associated with the sliding jaw to cause said jaw and rocking arm to move in proper sequence.

CHARLES H. BENCKENSTEIN.